Patented Aug. 27, 1935

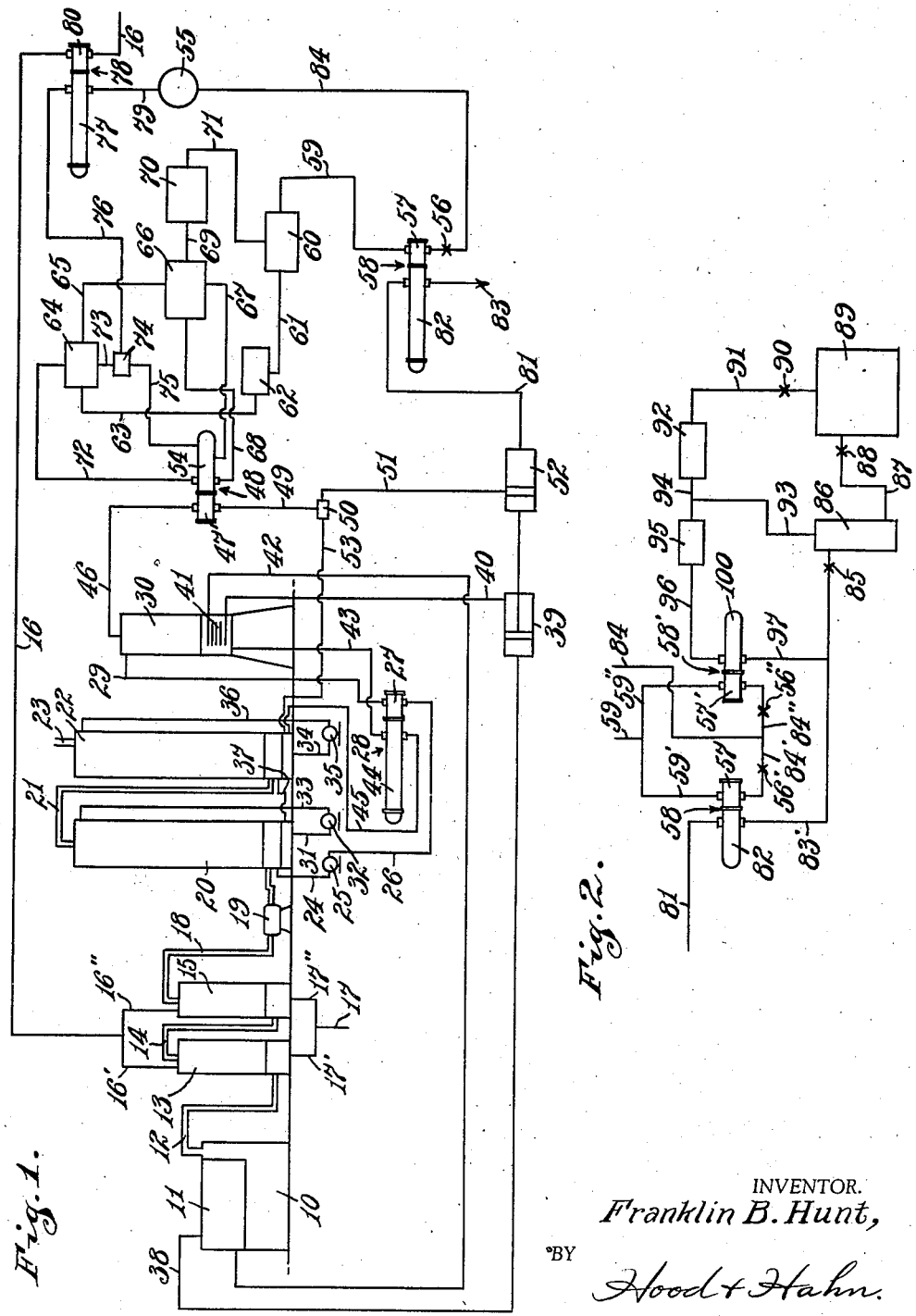

2,012,587

UNITED STATES PATENT OFFICE 2,012,587

PROCESS OF AND APPARATUS FOR MANUFACTURING LIQUID AND SOLID CARBON DIOXIDE

Franklin B. Hunt, Chicago, Ill., assignor to The Liquid Carbonic Corporation, Chicago, Ill., a corporation of Delaware Application March 26, 1932, Serial No. 601,313

14 Claims. (Cl. 62—179)

The present application relates to a process of and apparatus for manufacturing liquid and solid carbon dioxide, and a primary object thereof is so to improve the efficiency of a known process, primarily by energy conservation and utilization, as to substantially eliminate the necessity for purchasing any power. Further and subsidiary objects of the invention will appear as the description proceeds.

To the accomplishment of the above and related objects, my invention may be embodied in the forms illustrated in the accompanying drawing, attention being called to the fact, however, that the drawing is illustrative only, and that change may be made in the specific constructions illustrated and described, or in the specific steps stated, so long as the scope of the appended claims is not violated.

Fig. 1 is a diagrammatic illustration of apparatus arranged in accordance with my invention and capable of producing liquid carbon dioxide, the drawing being more in the nature of a flow sheet than of an illustration of mechanism; and Fig. 2 is a diagrammatic illustration of the elements which may be added to the organization of Fig. 1 to carry the liquid carbon dioxide on into the solid phase.

Referring more particularly to the drawing, it will be seen that I have illustrated a furnace or combustion chamber 10 with which is associated a boiler 11. A flue 12 conducts the gaseous products of combustion from said combustion chamber 10 to a scrubber chamber 13, entering said chamber at the bottom; and a conduit 14 connects the upper end of said chamber 13 with the bottom of a second scrubber 15, to lead the gases washed in the chamber 13 to said chamber 15, where a second scrubbing operation takes place.

A pipe line 16 is connected to a suitable source of water (not shown), and said pipe line comprises a pair of branches 16' and 16", respectively, entering the upper ends of the chambers 13 and 15. Water outlet branches 17' and 17" leading respectively from the chambers 13 and 15 join in a waste pipe 17. A conduit 18 leads from the upper end of scrubber chamber 15 to conduct scrubbed gases from said chamber, a blower 19 providing means for urging gas flow through said conduit 18 and into the lower end of an absorber 20.

Said absorber 20 is partially filled with an absorbing medium for carbon dioxide which may be the so-called lye solution commonly used in the separation of carbon dioxide from flue gases. The solution most commonly used is an aqueous solution of sodium carbonate.

The gases which are not absorbed in the chamber 20 pass from the upper end thereof through a conduit 21 and into the lower end of a second absorber 22, likewise containing an absorbing medium; and a conduit 23 leads from the upper end of said chamber 22 to conduct therefrom the waste gases which are not absorbed in said chambers 20 and 22.

The solution within the chambers 20 and 22 absorbs from the gaseous mixture a considerable proportion of the carbon dioxide therein.

In the art, the term "strong lye" is used to denote a sodium carbonate solution which has absorbed a relatively large quantity of carbon dioxide; and the term "weak lye" is used to refer to a solution having very little, if any, carbon dioxide absorbed therein. The terms will be so used herein.

A pipe 24 is connected to the lower end of the chamber 20 to conduct therefrom the strong lye, a pump 25 being provided to force the strong lye through a pipe 26 and through one end 27 of a heat interchanger 28, and thence through a pipe 29 into the lye boiler 30.

A second pipe 31 is connected to the lower end of chamber 20 and to a second pump 32, said pump effecting circulation of the lye solution through the pipe 31 and a pipe 33, said pipe 33 discharging into the upper end of the absorber 20, whereby a falling curtain of lye solution is provided in the absorber 20 through which the rising gases must pass.

Similarly, a pipe 34 is connected to the lower end of the absorber 22, and a pump 35 enforces circulation through the pipe 34 and a pipe 36 discharging into the upper end of the absorber 22. A pipe 37 provides for flow of relatively strong lye from the absorber 22 into the absorber 20.

Combustion of fuel in the chamber 10 produces the carbon dioxide which is separated from the other flue gases in the manner just described, and it also produces heat which is used to evaporate water in the boiler 11. A pipe 38 conducts the steam so formed to a steam engine 39, and it is customary in the art to exhaust the steam from the engine 39 at about 250° F. The steam so exhausted is led through a pipe 40 to heater coils 41 associated with the boiler 30, and there substantially all of such exhaust steam is condensed in the process of heating the solution in said boiler. The condensate is returned through a pipe 42 to the main boiler 11.

As the solution in the boiler 30 is heated, carbon dioxide and steam are driven off at a temperature of about 225° to 230° F., and under ordinary conditions, the mass of water so evaporated ranges from one to three times the mass of carbon dioxide driven off. It is customary to separate the carbon dioxide from this steam by condensing the steam, using running water to cool the mixture and thereby wasting the heat energy stored in the steam and carbon dioxide.

After the carbon dioxide concentration of the solution has been suitably reduced by boiling, the weak lye is returned, through a pipe line 43, said weak lye solution passing through the opposite end 44 of the heat exchanger 28, and being returned by the pipe 45 to the lower end of the absorber 22. The steam and carbon dioxide driven off from the solution in the boiler 30 passes out through a pipe 46.

Thus far, the elements described are well known in the art.

According to the present invention, instead of cooling the mixture passing through the pipe 46 with running water, and so wasting the heat of the mixture, I propose to pass such mixture through the heating coil of the generator of an ammonia absorption refrigerating system, whereby the heat of such mixture is utilized to produce a refrigerating effect. As is illustrated in the drawing, the pipe 46 leads to the heating unit 47 of the generator 48 of such a refrigerating system. In said generator, the mixture is cooled, and the steam therein is condensed. The condensate and carbon dioxide are conducted from said coil 47 through a pipe 49 to a separator 50 where the condensate is separated from the carbon dioxide, and the carbon dioxide is led thence through a pipe 51 to a compressor 52 driven by the engine 39. The condensate is led from the separator 50 through a pipe 53 to the lower end of the absorber 22.

Ammonia absorption refrigerating systems are known. Such a system comprises an absorber 60 wherein ammonia is absorbed in water. A pump 62 draws the aqueous ammonia solution from the absorber 60 through a pipe 61, and forces it through a pipe 63 to and through a rectifier 64, and thence through a pipe 65 to and through a heat exchanger 66 hence the solution passes through a pipe 67 to the other end 54 of the generator 48. There, the ammonia solution is heated by the mixture driven off in the boiler 30, whereby ammonia vapor and a small amount of water vapor is driven off from the ammonia solution. This mixture of gaseous ammonia and water vapor passes from the generator through the pipe 72 and thence through the rectifier 64. In such rectifier, the solution passing through the pipes 63 and 65 as above-described is heated, while the vaporous mixture is cooled, whereby the water vapor in such mixture is condensed, and the mixture of ammonia vapor and water passes through the pipe 73 to the separator, where the water separates from the vapor and flows through the pipe 75 back into the generator 54. The ammonia vapor flows from the separator through the pipe 76 to one end 77 of a condenser 78, where such vapor is condensed, the pressure upon the condensed vapor depending upon the temperature of the cooling water supplied to the end 80 of the condenser 78 by the pipe line 16. The liquid ammonia flows from the condenser 77 through a pipe 79 to an ammonia receiver 55.

The condensed water separated from the ammonia vapor in the separator 74 returns, as stated, to the end 54 of the generator 48 where it mixes with the weak ammonia solution therein, and this mixture flows thence through the pipe 68 and through the exchanger 66, where it gives up its heat to the solution flowing through the pipes 65 and 67. The cooled condensate flows from the exchanger 66 through the pipe 69 and into a cooler 70 where it is still further cooled, and thence through the pipe 71 back to the absorber 60 to absorb more ammonia.

Under certain conditions, for instance, when the water flowing through pipe 16 is at a temperature as high as approximately 70° F., it may be necessary to provide a water cooled condenser between the rectifier 64 and the separator 74, in order to condense all of the steam mixed with the carbon dioxide. Water which has been used elsewhere in the system may be used to cool this condenser.

From the receiver 55 liquid ammonia flows through the pipe 84 and past an expansion valve 56 to one end 57 of a condenser 58 where it refrigerates the compressed carbon dioxide discharged from the compressor 52 and flowing through a pipe 81 to the opposite end 82 of said condenser 58. Such refrigeration of the carbon dioxide liquefies the carbon dioxide, and liquid carbon dioxide is discharged through the pipe 83.

Tests have shown that the liquid ammonia evaporates in the condenser 58 at a temperature of about minus 8° F. The compressor 52 is preferably a two-stage compressor, and carbon dioxide leaves that compressor at a pressure of about 300 pounds per square inch absolute. It will thus be seen that condensation of the carbon dioxide at this relatively low pressure is very easy, with the temperatures which can be attained through the use of ammonia as a refrigerant.

The ammonia vapor returns from the condenser 58 through the pipe 59 to the absorber 60 where it is again absorbed in the water therein, and the cycle is repeated.

The heat of absorption developed in the absorber may be removed in any desired manner, as by cooling water.

Fig. 2 discloses an organization of elements which may be added to the organization disclosed in Fig. 1, although Fig. 2 reproduces the illustration of the condenser 58. If the mechanism disclosed in Fig. 2 is added to that disclosed in Fig. 1, the liquid carbon dioxide is discharged from the condenser 58, at a temperature of approximately 0° F., through the pipe 83'. It flows through an expansion valve 85 into an evaporator 86 operating, for instance, at a pressure of approximately 150 pounds per square inch absolute. Such evaporation reduces the temperature of the liquid, and produces a certain amount of gaseous carbon dioxide. The liquid, now at a temperature of approximately minus 40° F., is allowed to accumulate in the evaporator while the evolved gas flows through a pipe 93 and a pipe 94 to the second stage 95 of a two-stage compressor, where it is recompressed and led through a pipe 96 to one end 100 of a condenser 58'.

The pipe 84 branches as at 84' and 84'', the pipe 84' leading through an expansion valve 86' to the end 57 of the condenser 58, and a pipe 59' leading from said condenser end 57 to the pipe 59; and the branch 84'' leads through an expansion valve 56'' to the end 57' of the condenser 58', a pipe 59'' leading from said condenser end 57'' to the pipe 59. Thus, the compressed carbon dioxide fed to the end 100 of the condenser 58' is refrigerated to effect condensation thereof, and the liquid is led from said condenser 58' through the pipe 97 back to the pipe 83'.

When a sufficient quantity of liquid carbon dioxide at approximately minus 40° F. has accumulated in the evaporator 86, such liquid is permitted to flow through the pipe 87 and the expansion valve 88 into the press chamber 89. Here further evaporation takes place, to effect solidification of the carbon dioxide, the gas evolved by such evaporation passes through the pressure controlling valve 90 in the pipe 91 to the first stage 92 of the two-stage compressor, thence through the pipe 94 to the second stage 95 of said compressor, and so to the condenser 100.

The process herein described is old and well known, except for the fact that, in ordinary practice, the steam which is driven off from the boiler 30 is condensed in a water condenser, whereby the latent heat of such steam is wasted, and except for the further fact that the cooling of the carbon dioxide which, according to the present invention, is effected in the generator 48 and the condensers 58 and 58' is, in ordinary practice, effected likewise by water coolers. Quite obviously, the utilization of the latent heat of the steam driven off from the boiler 30 to generate refrigeration results in a very great saving of energy; and just as obviously, the utilization of the refrigeration so generated to cool the carbon dioxide in the liquefaction and solidification process will likewise result in a saving of energy because of the fact that much lower temperatures can be attained, with the result that liquefaction and solidification can be effected at much lower pressures.

It is not unusual for commercial plants to produce a thousand pounds of carbon dioxide per hour. In very efficient plants, and on the basis of such production, approximately one pound of steam at approximately 230° F. will be boiled out of the boiler 30 for every pound of carbon dioxide produced. Thus it will be seen that, under the conditions assumed, approximately twenty-four thousand pounds of steam at 230° F. can be supplied to the heating coil 47 of the generator 54 of the refrigerating system per day. It is an established fact that, under such conditions, such a refrigerating system will produce a refrigerating effect equivalent to approximately thirty tons of ice per day at a temperature of approximately zero degrees Fahrenheit.

In less efficient plants, from 2½ to 8 pounds of steam will be produced in the lye boiler for every pound of carbon dioxide produced, and the temperature of such steam varies from about 230° to about 250° F. It will be seen that, in such plants, still greater amounts of refrigeration can be produced through the use of this steam, thereby effecting still greater economies.

When water at a temperature of from 70° to 80° is used to remove the latent heat of the carbon dioxide in the liquefaction and solidification process, it is common practice to compress the carbon dioxide in a three-stage compressor to a pressure of 900 to 1000 pounds per square inch. Such a pressure is necessary in order to attain commercially satisfactory liquefaction or solidification, since the temperature of the carbon dioxide cannot be brought to a value much lower than ten degrees above the temperature of the cooling water. If, instead of using water at 70° to 80° F., ammonia or some similar refrigerant at a temperature of zero degrees Fahrenheit is used to remove the latent heat of the carbon dioxide, liquefaction can be effected at a pressure of approximately 300 pounds per square inch. A two-stage compressor can be used under these circumstances, whereby approximately one-third of the usual work of compression is saved.

Under the conditions assumed, the refrigerating system will generate more refrigerating effect than is required to attain the indicated saving, and this excess refrigerating effect can be applied to the solidification of carbon dioxide. Under ordinary conditions, where water at 70° to 80° F. is used to cool the carbon dioxide, more than one-third of the total work of compression required to solidify the carbon dioxide is done in the high-stage cylinder. If ammonia, or some similar refrigerant at approximately zero degrees Fahrenheit is used instead of the cooling water, the high-stage of the recompression process can be eliminated.

The power necessary to provide the liquefying compression is reduced by the present process by an amount which is sufficient to effect the recompression required to solidify the carbon dioxide, if ammonia or some similar refrigerant at approximately zero degrees Fahrenheit is used to cool the carbon dioxide.

It will thus be seen that the essential feature of the present invention lies in the utilization of the latent heat of the steam, necessarily produced in the well known coke-lye process, and heretofore wasted, to generate refrigeration; and the utilization of that refrigeration to cool the produced carbon dioxide, whereby the power required to liquefy or solidify the carbon dioxide is very materially reduced.

It is not unusual, in commercial plants, to find that one kilowatt of purchased electric power is used in the production of eight to ten pounds of solid carbon dioxide. This power is, of course, that which is required over and above the power supplied by the steam produced in the boiler 11. The use of the present process will certainly reduce the amount of purchased power to a negligible quantity, and will probably eliminate it altogether.

I claim as my invention:

1. In the coke-lye process of producing carbon dioxide, the step of condensing in the generator coil of an ammonia absorption refrigerating system, the steam driven off in the lye boiler, separating the carbon dioxide from the condensate, and utilizing the refrigeration created in said refrigerating system to cool the carbon dioxide.

2. The method of producing non-gaseous carbon dioxide which comprises the steps of burning fuel to produce a gaseous mixture including carbon dioxide, utilizing the heat of such combustion to produce steam, using such steam to drive an engine, separating the carbon dioxide from such gaseous mixture by absorption in an aqueous solution, using the steam exhausted from the engine to drive off steam and carbon dioxide from said solution, condensing the steam, so driven off, in the generator coil of an absorption refrigerating system to generate refrigeration, separating the carbon dioxide from the condensate so formed, and utilizing the refrigeration so generated to cool the carbon dioxide, and compressing the carbon dioxide by the power developed by the engine to effect a phase change of said carbon dioxide.

3. The method of producing non-gaseous carbon dioxide from a gaseous mixture including carbon dioxide, which comprises the steps of separating the carbon dioxide from such gaseous mixture by absorption in an aqueous solution, heating such mixture to drive off steam and carbon dioxide therefrom, condensing the steam, so driven off, in the generator coil of an absorption refrigerating system to generate refrigeration, separating the carbon dioxide from the condensate so formed, and alternately compressing said carbon dioxide and cooling the same by the refrigeration so generated; to effect a phase change thereof.

4. The method of utilizing waste energy developed in the coke-lye process of producing carbon dioxide, which comprises the steps of condensing the steam driven off from the lye boiler in the generator coil of an absorption refrigerating system, and utilizing the refrigeration so developed to cool the carbon dioxide in the liquefaction process.

5. Apparatus for producing non-gaseous carbon dioxide, comprising a chamber containing a liquid for absorbing carbon dioxide, a second chamber, means connecting said chambers to permit liquid flow from one to the other, means for heating the liquid in said second chamber to drive off vapor and carbon dioxide therefrom, an absorption refrigerating apparatus including a generator heating coil, means for conducting the vapor and carbon dioxide from said second chamber to said heating coil, a compressor, means for conducting carbon dioxide from said coil to said compressor, a heat exchanger and means for bringing said carbon dioxide into heat-exchanging relation with refrigerant conducted from said refrigerating apparatus.

6. Apparatus for producing non-gaseous carbon dioxide, comprising a fuel burner, a boiler associated therewith, a chamber containing a liquid for absorbing carbon dioxide, means for conducting the gaseous products of combustion at said burner to said chamber, a second chamber, means connecting said chambers to permit liquid flow from one to the other, a steam engine, means for conducting steam from said boiler to drive said engine, means for conducting steam exhausted from said engine into heat-exchanging relation with the liquid in said second chamber, whereby vapor and carbon dioxide are driven off therefrom, an absorption refrigerating apparatus including a generator heating coil, means for conducting the vapor and carbon dioxide from said second chamber to said heating coil, a compressor driven by said engine, means for conducting carbon dioxide from said coil to said compressor, a heat exchanger, and means for bringing said carbon dioxide into heat-exchanging relation with refrigerant conducted from said refrigerating apparatus.

7. The herein described process which comprises the steps of heating a solution to drive therefrom a mixture of a gas and a vapor, condensing the vapor in the generator of an absorption refrigerating system, and utilizing the refrigeration so generated to cool the gas.

8. The herein described process which comprises the steps of heating a solution to drive therefrom a mixture of a gas and a vapor, condensing the vapor in the generator of an absorption refrigerating system, separating the condensate from the gas, and utilizing the refrigeration so generated to cool the gas.

9. The herein described process which comprises the steps of burning fuel to generate a gas, absorbing such gas in a liquid, utilizing the heat of combustion of such fuel to drive off a mixture of such gas and a mass of vapor from such liquid, condensing the vapor in the generator of an absorption refrigerating system, and utilizing the refrigeration so generated to cool the gas.

10. The herein described process which comprises the steps of burning fuel to generate a gas and to make steam, using the steam so generated to drive an engine, applying the heat of the steam exhausted from said engine to activate an absorption refrigerating system, and utilizing the refrigeration so generated to cool such gas.

11. The herein described process which comprises the steps of burning fuel to generate a gas and to make steam, using the steam so generated to drive an engine, applying the heat of the steam exhausted from said engine to activate an absorption refrigerating system, compressing such gas by the operation of said engine, and utilizing the refrigeration so generated to cool such gas, whereby a change of phase of said gas is effected.

12. The herein described process which comprises the steps of burning fuel to generate power and excess heat, the combustion of such fuel resulting in the generation of a gas, utilizing the power so generated to compress such gas, utilizing the excess heat so generated to activate an absorption refrigerating system, and utilizing the refrigeration generated by such system to cool such gas, whereby such gas is caused to undergo a phase change.

13. The method of producing non-gaseous carbon dioxide which comprises the steps of burning fuel to produce a gaseous mixture including carbon dioxide, utilizing a portion of the heat energy generated upon the combustion of such fuel to drive an engine, separating the carbon dioxide from such gaseous mixture by absorption in a suitable liquid medium, utilizing a portion of such heat energy to drive the carbon dioxide out of such liquid medium, utilizing a portion of such heat energy to generate refrigeration, utilizing the refrigeration so generated to cool the carbon dioxide, and compressing the carbon dioxide by the power developed by the engine to effect a phase change of said carbon dioxide.

14. The method of producing non-gaseous carbon dioxide which comprises the steps of burning fuel to produce a gaseous mixture including carbon dioxide, separating the carbon dioxide from such mixture, utilizing a portion of the heat energy generated upon the combustion of such fuel to drive an engine, utilizing a portion of such heat energy to generate refrigeration, utilizing the refrigeration so generated to cool the separated carbon dioxide, and compressing the carbon dioxide by the power developed by the engine to effect a phase change of said carbon dioxide.

FRANKLIN B. HUNT.